(12) United States Patent
Bhoite

(10) Patent No.: US 12,104,551 B1
(45) Date of Patent: Oct. 1, 2024

(54) PISTON HAVING BAFFLE RING FOR LIMITING ABNORMAL COMBUSTION AND PISTON AND CYLINDER LINER ASSEMBLY

(71) Applicant: Caterpillar Inc., Peoria, IL (US)

(72) Inventor: Siddhesh Bharat Bhoite, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/426,463

(22) Filed: Jan. 30, 2024

(51) Int. Cl.
*F02F 3/00* (2006.01)
*F02F 3/02* (2006.01)

(52) U.S. Cl.
CPC ...................................... *F02F 3/02* (2013.01)

(58) Field of Classification Search
CPC .................. F16J 1/09; F02F 3/00; F02F 3/22
USPC ....................................................... 123/193.6
See application file for complete search history.

(56) References Cited

U.S. PATENT DOCUMENTS

| | | | |
|---|---|---|---|
| 3,667,443 A * | 6/1972 | Currie | F16J 9/00 123/47 R |
| 5,743,171 A | 4/1998 | Ariga | |
| 6,478,003 B2 * | 11/2002 | Laimbock | F02F 3/00 123/193.6 |
| 6,675,762 B2 | 1/2004 | Han | |
| 6,935,220 B2 * | 8/2005 | Dunaevsky | F02F 3/00 92/159 |
| 7,963,212 B2 * | 6/2011 | Ishida | F16J 1/09 92/159 |
| 8,403,334 B2 | 3/2013 | Lahrman | |
| 8,616,556 B2 | 12/2013 | Hayashi | |
| 10,309,535 B2 | 6/2019 | Jenness et al. | |
| 11,047,293 B1 | 6/2021 | Schroeder et al. | |
| 2014/0020648 A1 * | 1/2014 | Azevedo | F16J 1/09 123/193.6 |

* cited by examiner

*Primary Examiner* — Long T Tran
*Assistant Examiner* — James J Kim
(74) *Attorney, Agent, or Firm* — Brannon Sowers & Cracraft PC

(57) ABSTRACT

A piston in a piston and cylinder liner assembly for an internal combustion engine includes a piston crown, and a plurality of piston rings seated within a plurality of ring grooves in a crown outer surface. The plurality of piston rings includes a baffle ring seated within an uppermost ring groove. A plurality of pressure balancing passages extend through the piston crown each from a first opening formed in an uppermost land to a second opening formed in a second land. The baffle ring may be a non-loaded ring structured to prevent oil droplets from entering a cylinder and causing abnormal combustion. In an embodiment, a shielding wall projects axially from an annular rim of the piston to prevent entry of oil not deflected by the baffle ring.

20 Claims, 2 Drawing Sheets

PISTON HAVING BAFFLE RING FOR LIMITING ABNORMAL COMBUSTION AND PISTON AND CYLINDER LINER ASSEMBLY

TECHNICAL FIELD

The present disclosure relates generally to limiting abnormal combustion in an internal combustion engine, and more particularly to a piston having an oil-blocking baffle ring.

BACKGROUND

Internal combustion engines are used throughout the world for a broad range of purposes ranging from vehicle propulsion to operation of electrical generators, pumps, and compressors. A typical internal combustion engine delivers fuel to a plurality of cylinders where the fuel is combusted with air to produce a rapid pressure and temperature rise that drives pistons coupled to a rotatable crankshaft to power a load. In an effort to optimize performance and efficiency, engineers are continually seeking ways to increase engine power density, understood generally as a power to weight ratio of an individual engine.

Power density of an engine can generally be increased by enabling the engine to burn relatively more fuel in each engine cycle, converting energy of the fuel into mechanical energy that can be used to perform useful work. The energy content of fuel can vary significantly across different fuel types, and engines purpose-built to operate on one fuel type can be challenging to adapt to operation on different fuel types, necessitating hardware changes and alterations to ignition and other control strategies. In the case of certain gaseous fuel engines in particular, efforts to increase power density can be limited by various confounding factors. In other words, while theoretically increasing an amount of gaseous fuel burned in an engine cycle could increase power density, as more and more fuel is delivered into an engine cylinder for combustion other problems and challenges can arise. As a result, power densities can remain below their theoretical upper bounds.

Engineers have observed that various combustion chamber features can impact the combustion process, in unpredictable and/or non-linear ways, when attempting to balance often competing factors such as power density, emissions, thermal management, and still others. One known example of a piston configured for optimal performance in certain respects is set forth in U.S. Pat. No. 11,047,293 B1 to Schroeder et al.

SUMMARY

In one aspect, a piston includes a piston crown defining a piston center axis, and including an annular rim extending circumferentially around a combustion bowl. The piston crown includes a crown outer surface having a plurality of ring grooves including an uppermost ring groove formed therein. The piston further includes a plurality of piston rings seated within the plurality of ring grooves and including a baffle ring seated within the uppermost ring groove. The crown outer surface further includes an uppermost land and a second land, and the uppermost ring groove is formed axially between the uppermost land and the second land. The piston crown further includes a plurality of pressure balancing passages having a circumferential distribution around the piston center axis, and each extending through the piston crown from a first opening formed in the uppermost land to a second opening formed in the second land.

In another aspect, a piston for an internal combustion engine includes a piston crown defining a piston center axis and including an annular rim extending circumferentially around a combustion bowl, and a crown outer surface having formed therein each of an uppermost ring groove, a scraper ring groove, a compression ring groove, and an oil ring groove. The crown outer surface further includes an uppermost land and a second land, and the uppermost ring groove is formed axially between the uppermost land and the second land. The piston crown further includes a plurality of pressure balancing passages, and each extending through the piston crown from a first opening formed in the top land to a second opening formed in the second land.

In still another aspect, a piston and cylinder liner assembly includes a cylinder liner and a piston positioned in the cylinder liner and defining a piston center axis. The piston includes an annular rim extending circumferentially around a combustion bowl, and a plurality of piston rings including an uppermost baffle ring, a scraper ring, a compression ring, and a lowermost oil ring. The baffle ring includes a non-loaded ring, and each of the scraper ring, the compression ring, and the oil ring includes a loaded ring. The piston further includes a pressure balancing passage formed therein and fluidly connecting from a location axially above the baffle ring to a location axially below the baffle ring.

DETAILED DESCRIPTION

Figure 1:
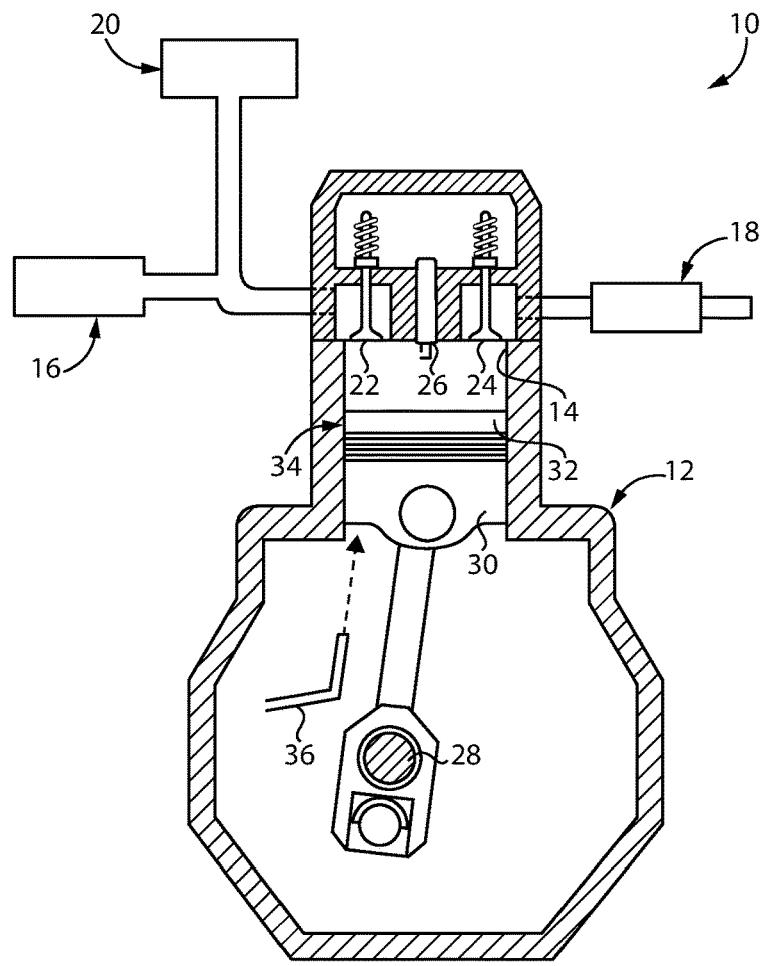
FIG. 1 is a diagrammatic view of an internal combustion engine system, according to one embodiment.

Referring to FIG. 1, there is shown an internal combustion engine system 10, according to one embodiment. Engine system 10 includes an engine housing 12 having a cylinder 14 formed therein. Cylinder 14 may be one of any number of cylinders in any suitable arrangement, such as a V-pattern, an in-line pattern, or still another. Engine system 10 also includes an intake system 16 configured to convey intake air to cylinder 14, and typically conveying pressurized intake air from a compressor in an exhaust-operated turbocharger. An exhaust system 18 conveys exhaust products from cylinder 14 to a turbine in a compressor, an after-treatment apparatus, a tailpipe, or exhaust stack, for example. In some embodiments no aftertreatment system is used at all.

Engine system 10 also includes a fuel system 20. In the illustrated embodiment fuel system 20 is configured to convey a gaseous fuel to intake system 16 such that a mixture of pressurized intake air and a gaseous fuel in conveyed to cylinder 14 for combustion therein. Suitable gaseous fuels in the context of the present disclosure include gaseous molecular hydrogen, natural gas, methane, ethane, and various blends of these to name a few examples. An intake valve 22, typically one of two intake valves, controls fluid communication between cylinder 14 and intake system 16. An exhaust valve 24, again typically one of two, controls fluid communication between cylinder 14 and exhaust system 18. Various embodiments are contemplated wherein a gaseous fuel is delivered by fumigation admission upstream of a compressor in a turbocharger, port injected, manifold injected, or direct injected, or potentially combinations of these. A sparkplug 26 forms a spark gap within cylinder 14 for spark ignition of a mixture of gaseous fuel and air therein. A piston 30 is movable within cylinder 14 typically between a bottom-dead-center position and a top-dead-center position in a conventional four-stoke engine cycle, although the present disclosure is not thereby limited.

Also in the illustrated embodiment, piston 30 reciprocates in a cylinder liner 32 supported in engine housing 12. Piston 30 and cylinder liner 32 together form a piston and cylinder liner assembly 34. Those skilled in the art will be familiar with various cooling and lubrication strategies used in internal combusting engines. In engine system 10, an oil spray tube 36 is oriented to spray oil, such as engine oil, onto an underside of piston 30 to cool and lubricate the same. Engine oil will also be provided through engine housing 14 and through cylinder liner 32. As further discussed herein, piston 30 and piston and cylinder liner assembly 34 are uniquely configured to mitigate certain combustion phenomena related to ignition of oil that in certain known systems can be observed to make its way into a combustion cylinder and ignite therein.

Figure 2:
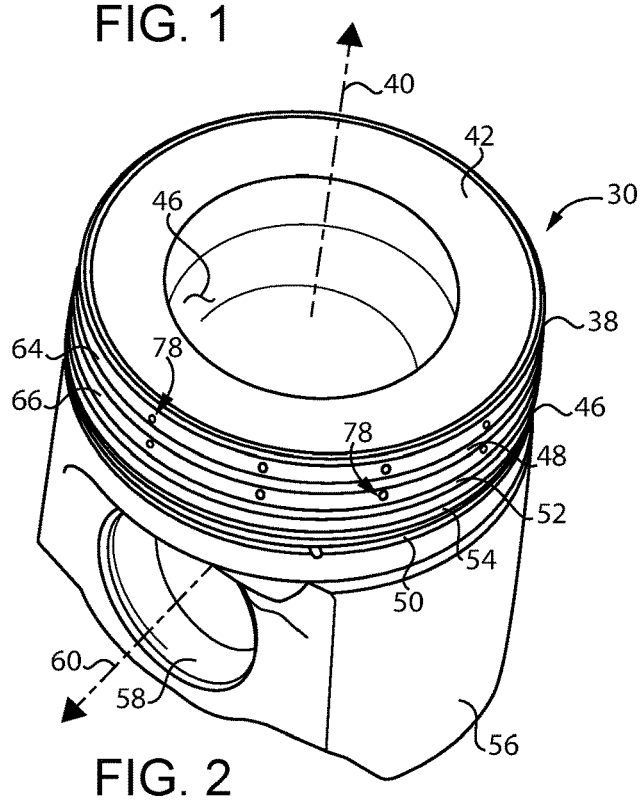
FIG. 2 is a diagrammatic view of a piston, according to one embodiment.
Figure 3:
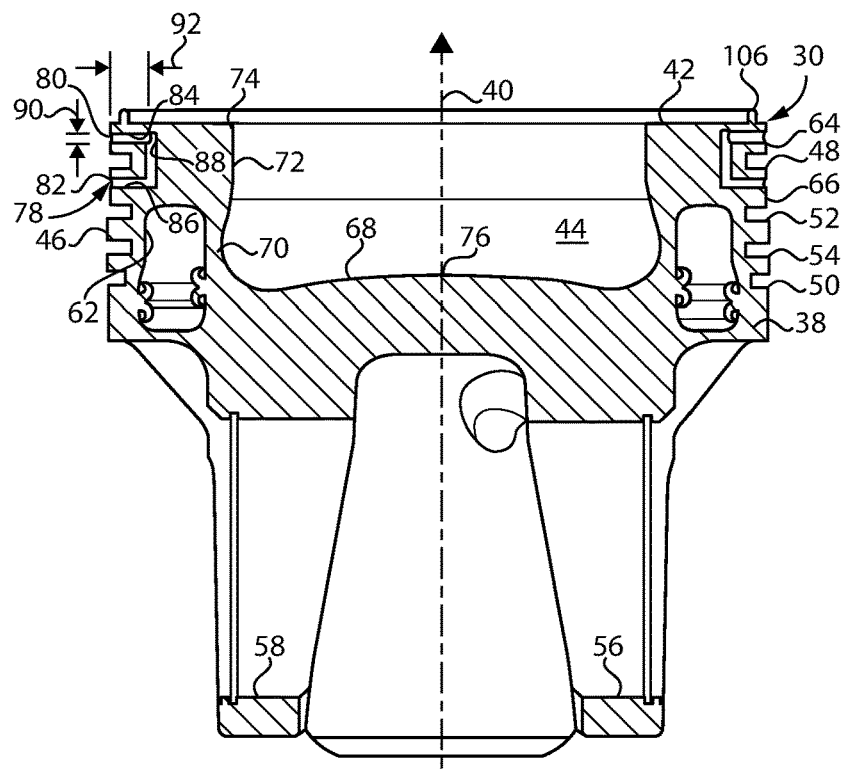
FIG. 3 is a sectioned side diagrammatic view of a piston, according to one embodiment.
Figure 4:
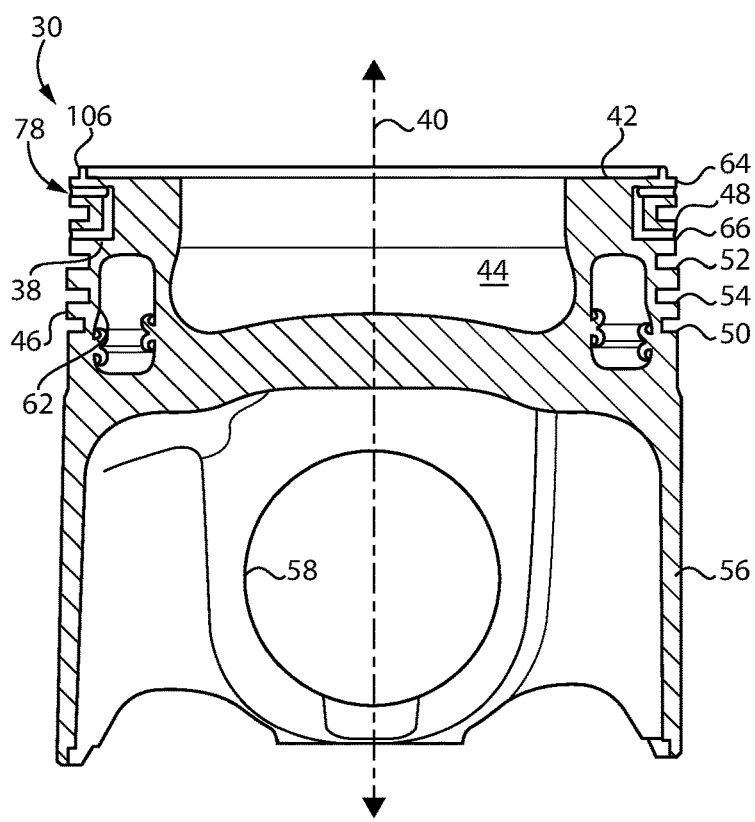
FIG. 4 is another sectioned side diagrammatic view of a piston, rotated 90 degrees relative to the view of FIG. 3, according to one embodiment.

Referring also now to FIGS. 2-4, piston 30 includes a piston crown 38 defining a piston center axis 40. Piston crown 38 includes an annular rim 42 extending circumferentially around a combustion bowl 44. Piston crown 38 further includes a crown outer surface 46 having a plurality of ring grooves 48, 50, 52, 54 therein. The plurality of ring grooves includes an uppermost ring groove 48 that can be understood as a baffle ring groove. Ring groove 52 includes a scraper ring groove, ring groove 54 includes a compression ring groove, and ring groove 50 includes a lowermost oil ring groove, each including seated therein a different piston ring as further discussed herein. Piston 30 further includes a piston skirt 56 attached to piston crown 38 and having a wrist pin bore 58 formed therein defining a wrist pin axis 60. An oil gallery 62 may be formed at least in part in piston crown 38 and can be equipped with holes (not shown) that receive a spray of oil from oil spray tube 36. Crown outer surface 46 further includes an uppermost land 64 and a second land 66. Uppermost ring groove or baffle ring groove 48 is formed axially between uppermost land 64 and second land 66.

Looking to features of combustion bowl 44, as shown in FIG. 3 piston crown 38 includes a lower bowl surface 68. Lower bowl surface 68 may have a spherical shape in some embodiments, defining a peak point 76 intersected by piston center axis 40. Lower bowl surface 68 extends axially outward to a bowl swirl pocket wall 70 forming a swirl pocket, and a bowl upper wall 72 extending axially to a bowl edge 74 forming an intersection between annular rim 42 and bowl upper wall 72. In an embodiment, bowl upper wall 72 may be oriented parallel to piston center axis 40, and bowl swirl pocket wall 70 may extend radially outward of bowl upper wall 72 such that radially outermost extents of combustion bowl 44 are formed by bowl swirl pocket wall 70. Peak 76 may be axially recessed below a location at which bowl swirl pocket wall 70 intersects bowl upper wall 72.

Piston crown 38 further includes a plurality of pressure balancing passages 78 having a circumferential distribution around piston center axis 40. Each of pressure balancing passages 78 extends through piston crown 38 from a first opening 80 formed in uppermost land 64 to a second opening 82 formed in second land 66. In an embodiment, a total number of pressure balancing passages 78 is greater than four, and a total number of pressure balancing passages may be twelve in some embodiments. According to a practical implementation strategy, the total number of pressure balancing passages 78 may be from four to twelve. Pressure balancing passages 78 may be regularly distributed around piston center axis 40.

Considering further details of pressure balancing passages 78, each passage may form a first hole 84 extending radially inward from the respective first opening 80, a second hole 86 extending radially inward from the respective second opening 82, and a connector hole 88 extending axially between the respective first hole 84 and second hole 86. First hole 84 and second hole 86 may each extend on a radius of a circle defined by piston center axis 40. Connector hole 88 may extend axially and in an orientation that is parallel to piston center axis 40.

As identified in FIG. 3, each respective first hole 84 and second hole 86 may define a nominal diameter 90 and a bore distance 92 greater than nominal diameter 90 by a factor ranging from about two to about seven. In an example, nominal diameter 90 may be from three millimeters to five millimeters and bore distance 92 may be from ten millimeters to twenty millimeters. As used herein, relative terms such as "about" can be understood to mean generally or approximately, including within measurement error or another suitable tolerance as would be understood by a person of ordinary skill in the technical field of piston design. As used herein, the term bore distance can be understood as a linear distance defined by the respective first holes 84 and/or second holes 86 from crown outer surface 46 to a respective connector hole 88.

Piston 30 may further include a shielding wall 106 projecting axially from annular rim 42. Shielding wall 106 may extend circumferentially around piston center axis 40 and is spaced radially inward of uppermost land 64. Shielding wall 106, as further discussed herein can assist in limiting entry of oil droplets into cylinder 14 and potentially in cooperation with other features of piston 30 further discussed herein. Shielding wall 106 may be attached to piston crown 38, and in an embodiment formed as a separate piece that is irreversibly attached to annular ring 42. In an example embodiment, shielding wall 106 may be formed as an extrusion that is, for example, welded attached to annular rim 42 after piston crown 38 is formed by casting, forging, or another process. Shielding wall 106 may be formed of a material having a porosity greater than a porosity of a material forming annular piston rim 42. The lesser porosity of the material of shielding wall 106 may assist in limiting any formation of hot spots or the like that can lead to deposit formation or other problems. In an example implementation, piston crown 38 can be formed as a first piece that is attached to piston skirt 56 by way of a friction welding process, such as inertia welding. Shielding wall 106 may be extruded and attached to annular rim 42 such as by way of another welding process. Further, piston crown 38, piston skirt 56, and shielding wall 106 may all be formed of a similar base material, such as iron, steel, aluminum, or various alloys, and shielding wall 106 is formed of that same material but having a different porosity. Shielding wall 106 may be located radially outward of radially innermost extents of pressure balancing passages 78 as defined by the respective connector holes 88.

Figure 5:
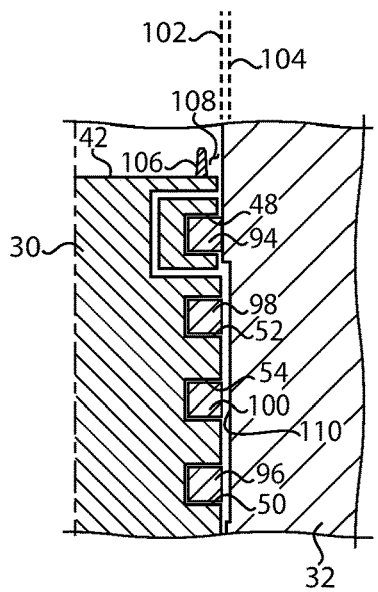
FIG. 5 is a sectioned side diagrammatic view of a piston and cylinder liner assembly, according to one embodiment.

Referring also now to FIG. 5, it will be recalled that piston 30 may include a plurality of piston rings. Piston 30 may include a baffle ring 94 seated in uppermost ring groove 48, an oil ring 96 seated in lowermost ring groove 50, a scraper ring 98 seated in ring groove 52, and a compression ring 100 seated in ring groove 54. Scraper ring 98 is positioned axially between oil ring 96 and baffle ring 94. Compression ring 100 is positioned axially between oil ring 96 and scraper ring 98. Those skilled in the art will be familiar with pistons having a plurality of piston rings, in a common example a piston having three piston rings. As will be observed from the present disclosure piston 30 may have a total of four piston rings, with each of piston rings 96, 98, and 100 performing generally conventional roles. Baffle ring 94 may, however, perform an entirely different role than any piston ring in any known designs. During service, as piston 30 reciprocates, oil sprayed from oil sprayer 36, as well as potentially oil coming in through cylinder liner 32 from engine housing 14 can flow circumferentially around and to some extent axially up or down around piston 30 providing cooling and lubrication. It has been observed that small bits of oil, such as in the form of droplets, can potentially migrate up from a clearance between a piston and a cylinder liner into a cylinder combustion chamber. Combustion of such oil can result in so-called abnormal combustion in the cylinder, triggering early combustion or multiple ignition locations within a cylinder or causing other problems. It is generally desirable for combustion of a main charge to be reliably and precisely controlled in a spark ignited engine based on a timing of production of a spark. Ultimately, abnormal combustion caused by ignition of oil droplets or the like in a cylinder can limit the power density capabilities of the associated engine. Put differently, at high loads, burning a relatively larger main fuel charge, a tendency for oil droplet ignition to cause abnormal combustion can be relatively higher than at lower loads, ultimately limiting an amount of fuel that can be burned in a given engine cycle. These challenges tend to be particularly acute with respect to gaseous fuel spark ignited engines.

Baffle ring 94 can assist in limiting upward migration of oil between piston 30 and cylinder liner assembly 32, limiting likelihood of oil making its way into cylinder 14 and causing abnormal combustion. Shielding wall 106 project axially upward from annular piston rim 42 assisting in preventing intrusion of any oil droplets that do make their way past baffle ring 94. In an embodiment, baffle ring 94 includes a non-loaded ring. Each of scraper ring 98, oil ring 96, and compression ring 100 may include a loaded ring. The distinction between non-loaded and loaded can be understood in terms of a tendency for a piston ring to expand radially outward against a cylinder liner wall when positioned for service in the cylinder line. Baffle ring 94 pushes little, if at all, radially outward against cylinder liner 32. The other piston rings are each spring-loaded to some extent so as to push radially outward against cylinder liner 32. As depicted in FIG. 5, a first outer diameter dimension is shown at 102 and a second outer diameter dimension is shown at 104. When piston 30 is not positioned within cylinder liner 42, non-loaded baffle ring 94 might define the relatively smaller outer diameter dimension 102. At least one, and typically all, of oil ring 96, scraper ring 98, and compression ring 100 may define the relatively larger outer diameter dimension 104 when piston 30 is not positioned within cylinder liner 42. Explained another way, baffle ring 94 can be slipped into cylinder liner 32 without radial compression. Each of piston rings 96, 98, 100 are reduced in diameter against a spring bias to enable positioning within cylinder liner 32. It is contemplated that at least one of a stiffness or an outer diameter dimension of baffle ring 94 is least among stiffnesses and outer diameter dimensions of the plurality of piston rings.

INDUSTRIAL APPLICABILITY

Referring to the drawings generally, when engine system 10 is operated piston 30 will move up and down between a top-dead-center position and a bottom-dead-center position in an engine cycle. Fuel system 20 is operated to provide a flow of a gaseous fuel into cylinder 14 for ignition and combustion in response to production of a spark with sparkplug 26. During operation, oil can flow into and around a clearance between piston 30 and cylinder liner 32, with the several piston rings performing their intended roles in service. It will be recalled pressure balancing passages 78 extend from above ring groove 48 to below ring groove 48, providing a fluid connection that can assist in limiting any pressure differential across baffle ring 94, and above compression ring 100, that might occur. Baffle ring 94 can thus block upward migration of oil, with any oil that does pass baffle ring 94 being prevented from entering cylinder 14 by way of shielding wall 106. A space or clearance 108 as shown in FIG. 5 may be defined between shielding wall 106 and cylinder liner 32. It is believed that small particles or droplets of oil that are blocked by shielding wall 106 may be prevented from exiting clearance 108 and eventually make their way back into the oil film within the lower clearance between piston 30 and cylinder liner 32. Cylinder liner 32 may be configured with one or more, and typically a plurality of slots 110 formed in a liner wall and fluidly connecting from a location axially above scraper ring 98 to a location axially below oil ring 96, assisting with oil return.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A piston comprising:
   a piston crown defining a piston center axis, and including an annular rim extending circumferentially around a combustion bowl, and a crown outer surface having a plurality of ring grooves including an uppermost ring groove formed therein;
   a plurality of piston rings seated within the plurality of ring grooves and including a baffle ring seated within the uppermost ring groove;
   the crown outer surface further including an uppermost land and a second land, and the uppermost ring groove is formed axially between the uppermost land and the second land; and
   the piston crown further including a plurality of pressure balancing passages having a circumferential distribution around the piston center axis, and each extending through the piston crown from a first opening formed in the uppermost land to a second opening formed in the second land.

2. The piston of claim 1 wherein a total number of the pressure balancing passages is greater than four.

3. The piston of claim 2 wherein the total number of the pressure balancing passages is twelve.

4. The piston of claim 2 wherein each of the plurality of pressure balancing passages forms a first hole extending radially inward from the first opening, a second hole extending radially inward from the second opening, and a connector hole extending axially between the first hole and the second hole.

5. The piston of claim 4 wherein each respective first hole and second hole defines a nominal diameter and a bore distance greater than the nominal diameter by a factor ranging from about 2 to about 7.

6. The piston of claim 5 wherein the nominal diameter is from 3 millimeters to 5 millimeters, and the bore distance is from 10 millimeters to 20 millimeters.

7. The piston of claim 1 wherein the plurality of piston rings includes an oil ring, a scraper ring positioned axially between the oil ring and the baffle ring, and a compression ring positioned axially between the oil ring and the scraper ring.

8. The piston of claim 7 wherein the baffle ring includes a non-loaded ring, and each of the scraper ring, the oil ring, and the compression ring includes a loaded ring.

9. The piston of claim 8 wherein at least one of a stiffness or an outer diameter dimension of the baffle ring is least among stiffnesses and outer diameter dimensions of the plurality of piston rings.

10. The piston of claim 1 further comprising a shielding wall projecting axially from the annular rim, the shielding wall extending circumferentially around the piston center axis and spaced radially inward of the uppermost land.

11. A piston for an internal combustion engine comprising:
a piston crown defining a piston center axis, and including an annular rim extending circumferentially around a combustion bowl, and a crown outer surface having formed therein each of an uppermost ring groove, a scraper ring groove, a compression ring groove, and an oil ring groove;
the crown outer surface further including an uppermost land and a second land, and the uppermost ring groove is formed axially between the uppermost land and the second land; and
the piston crown further including a plurality of pressure balancing passages, and each extending through the piston crown from a first opening formed in the top land to a second opening formed in the second land.

12. The piston of claim 11 further comprising a shielding wall projecting axially from the annular rim.

13. The piston of claim 11 wherein the shielding wall extends circumferentially around the piston center axis and is spaced radially inward of the uppermost land.

14. The piston of claim 13 wherein the shielding wall is formed of a material having a porosity greater than a porosity of a material forming the annular piston rim.

15. The piston of claim 13 wherein the shielding wall is located radially outward of radially innermost extents of the plurality of pressure balancing passages.

16. The piston of claim 11 wherein each of the plurality of pressure balancing passages forms a first hole extending radially inward from the first opening, a second hole extending radially inward from the second opening, and a connector hole extending axially between the first hole and the second hole.

17. The piston of claim 16 wherein a number of the plurality of pressure balancing passages is from 4 to 12.

18. A piston and cylinder liner assembly comprising:
a cylinder liner;
a piston positioned in the cylinder liner and defining a piston center axis, the piston including an annular rim extending circumferentially around a combustion bowl, and a plurality of piston rings including an uppermost baffle ring, a scraper ring, a compression ring, and a lowermost oil ring;
the baffle ring including a non-loaded ring, and each of the scraper ring, the compression ring, and the oil ring included a loaded ring; and
the piston further including a pressure balancing passage formed therein and fluidly connecting from a location axially above the baffle ring to a location axially below the baffle ring.

19. The piston and cylinder liner assembly of claim 18 wherein the cylinder liner further includes a liner wall having a slot formed therein and fluidly connecting from a location axially above the scraper ring to a location axially below the oil ring.

20. The piston and cylinder liner assembly of claim 18 wherein the pressure balancing passage is one of a plurality of pressure balancing passages having a circumferential distribution around the piston center axis, and the piston further including a shielding wall projecting axially from the annular piston rim and spaced radially inward of an outer crown surface of the piston.

* * * * *